(12) United States Patent
Fredlund et al.

(10) Patent No.: US 7,369,280 B2
(45) Date of Patent: May 6, 2008

(54) PORTABLE SYSTEM FOR CAPTURING IMAGES AND INFORMATION

(75) Inventors: John R. Fredlund, Rochester, NY (US); Richard S. Keirsbilck, Rochester, NY (US); Joseph A. Manico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1200 days.

(21) Appl. No.: 10/020,802

(22) Filed: Dec. 7, 2001

(65) Prior Publication Data

US 2003/0107775 A1 Jun. 12, 2003

(51) Int. Cl.
*H04N 1/00* (2006.01)

(52) U.S. Cl. .................. 358/400; 358/474; 358/442; 358/444

(58) Field of Classification Search .............. 358/497, 358/474, 487, 444, 505, 506; 396/211, 312, 396/319, 321; 348/231.3, 231.4, 231.7
See application file for complete search history.

(56) References Cited

U.S. PATENT DOCUMENTS

| | | | |
|---|---|---|---|
| 5,070,966 A * | 12/1991 | Brennan | 186/61 |
| 5,241,378 A * | 8/1993 | Nishiguchi | 358/500 |
| 5,555,105 A * | 9/1996 | Shahir et al. | 358/473 |
| 5,652,936 A | 7/1997 | Klees et al. | |
| 5,664,253 A | 9/1997 | Meyers | |
| 5,666,215 A * | 9/1997 | Fredlund et al. | 358/487 |
| 5,764,368 A * | 6/1998 | Shibaki et al. | 358/444 |
| 6,001,516 A | 12/1999 | Gasper | |
| 6,011,634 A * | 1/2000 | Aihara et al. | 358/468 |
| 6,020,982 A * | 2/2000 | Yamauchi et al. | 358/444 |
| 6,192,165 B1 * | 2/2001 | Irons | 382/306 |
| 6,232,973 B1 * | 5/2001 | Dow et al. | 358/473 |
| 6,344,906 B1 * | 2/2002 | Gatto et al. | 358/474 |
| 6,480,304 B1 * | 11/2002 | Os et al. | 358/474 |
| 6,567,190 B1 * | 5/2003 | Reele | 358/474 |
| 6,574,443 B1 * | 6/2003 | Butikofer et al. | 399/79 |
| 6,608,707 B1 * | 8/2003 | Han | 358/497 |
| 6,853,460 B1 * | 2/2005 | Yamamoto | 358/296 |
| 7,154,642 B2 * | 12/2006 | Lichtfuss | 358/474 |
| 2001/0052994 A1 * | 12/2001 | Murata | 358/1.15 |
| 2002/0021361 A1 * | 2/2002 | Kitajima et al. | 348/232 |
| 2003/0108347 A1 * | 6/2003 | Manico et al. | 396/207 |
| 2004/0027466 A1 * | 2/2004 | Mizobuchi | 348/231.4 |

\* cited by examiner

*Primary Examiner*—Kimberly A. Williams
(74) *Attorney, Agent, or Firm*—Susan L. Parulski; David A. Novais; Kathleen Neuner Manne

(57) ABSTRACT

A portable imaging system transportable by a user between a first and second location for scanning an image for later production of an image product. The system includes (a) a first and second member movable between an open and closed position; (b) a scanning area accessible when the system is in the open position for receiving and scanning the image to produce a digital image; (c) memory for storing the digital image; and (d) a communication port adapted to transmit the digital image from the portable imaging system to a device for later production of the imaging product comprising the digital image. In a preferred embodiment, the system includes a display for displaying the digital image.

5 Claims, 4 Drawing Sheets

PORTABLE SYSTEM FOR CAPTURING IMAGES AND INFORMATION

CROSS REFERENCE TO RELATED APPLICATION

Reference is made to commonly assigned application U.S. Patent Application Publication Number US2003/0108347A1, entitled "METHOD OF USING A PORTABLE SYSTEM FOR CAPTURING IMAGES", and filed on common date herewith in the names of Manico et al., and which is assigned to the assignee of this application.

FIELD OF THE INVENTION

The present invention relates generally to image processing, and more particularly, to a portable user accessible system for receiving and storing images for later printing, storing, transmitting, or for the production of an image product and/or service.

BACKGROUND OF THE INVENTION

To enjoy images captured on photographic film using a camera, a user must first have the exposed photographic film processed. This is typically accomplished by the user dropping off the exposed photographic film cartridge at a local retailer, such as a drugstore. At the retailer, the user can interact with the clerk, or use a system which is available for receiving undeveloped film and for delivering prints and the developed film to a customer. Such a system is disclosed in U.S. Pat. No. 5,652,936 (Klees), commonly assigned and incorporated herein by reference. Alternatively, a user can operate a stand alone photofinishing system, such as disclosed in U.S. Pat. No. 5,664,253 (Meyers), commonly assigned and incorporated herein by reference, which dispenses a print of the images.

It is a common desire to share and preserve personal photographs since they provide cherished memories of one's life. Therefore, there are occasions where a copy of the photograph is needed to share the memories Some people enjoy creating scrapbooks to share and preserve photographs. A scrapbook is a collection of scrapbook pages, each of which is a unique collection of at least photographs, paper crafts, and journaling. In general, each scrapbook page or a group of pages are based on a theme, and all of the components that make up that page(s) are in context with the theme. For example, a scrapbook page having a "holiday" theme would comprise photographs taken during that particular holiday, and paper craft depicting the holiday, for instance, a valentine heart cut out of red construction paper or a purchased die cut. In addition, the person making the scrapbook page would record information about the holiday, including who was shown in the photographs on the page(s) in the form of journaling. All of the components of a scrapbook page are arranged in an aesthetically pleasing manner which best depicts the essence of the theme. The components are typically glued in place, and the assembled scrapbook page is inserted into a scrapbook album. A purpose of making a scrapbook page versus simply placing photographs in a standard photo album is to create a unique, personalized family heirloom which tells a story and will be cherished for a lifetime.

The scrapbook business has grown over the past several years. Today, there are scrapbook specialty stores, magazines devoted to the craft, and a plurality of websites offering on-line merchandise sales and creative tips. However, on the other hand, the type of still photograph included in a scrapbook has gone relatively unchanged over 100 years.

If making a scrapbook page for a scrapbook album, the user may want a copy so as to not use his/her only copy of the photograph for the scrapbook page. Indeed, the resulting scrapbook page may be considered a "photograph" which the user desires a copy of.

Another occasion to need a copy of a photograph is to share treasured moments or heritage. Photographs of relatives may be cherished family photographs which the user desires to share with other members of the family. For example, a parent may send a copy of a photograph of their child's birthday party to a grandparent who lives out of town.

Scanners are available for scanning a photograph for conversion of the photograph for storage in digital form, such as on a floppy disk, compact disc, or memory card. Scanners are available for use with a home personal computer, however, such scanners are expensive, may not be easy to use by the novice computer operator, and may not provide a high resolution scan. In addition, the expense of the computer, scanner, and software is significant. Further, images printed on a home computer are typically inkjet prints, which may or may not include desired archival properties and quality.

Kiosks, such as the Kodak Picture Maker from Eastman Kodak Company, are available at retail locations for making reprints of photographs or prints of digital images. These kiosks generally include a scanner for scanning the photograph and creating a digital copy of the original photograph. The kiosk generally includes a dedicated computer system for simplifying the process of obtaining a copy/reprint of a photograph. However, there may be instances when a user is unable or unwilling to take a photograph to a retail location to make a reprint. For example, the photograph may be a cherished snapshot belonging to another person who is unwilling to be separated from the photograph for fear that the cherished shapshot will be lost or damaged. Or, there may be numerous photographs to be scanned and the user may be limited by time or location to travel to the kiosk.

Accordingly, a need continues to exist for a kiosk that is portable and suitable for use by a user at various locations, including a home environment. The portable kiosk must be able to convert photographs to a digital form, and store the digital form for later printing. In addition, the portable kiosk must be easy to use by a novice, sporadic user who may not be proficient at using an electromechanical device.

SUMMARY OF THE INVENTION

An object of the present invention is to provide a portable kiosk which is suitable for use in a non-retail or home environment which is able to convert photographs to digital form.

Another object of the invention is to provide such a portable kiosk which is easy to use by a sporadic user.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a portable imaging system transportable by a user between a first and second location for scanning an image for later production of an image product. The portable imaging system comprises (a) a first and second member movable between an open and closed position; (b) a scanning area disposed in either the first or second member and accessible when the system is in the open position for receiving and scanning the image to produce a digital image;(c) memory for storing the digital image; and (d) a communication port adapted to transmit the digital image from the portable imaging system over a communications network to a device for later production of the image product comprising the digital image.

According to another aspect of the invention, there is provided a portable imaging system transportable by a user between a first and second location for scanning an image for later production of an image product. The portable imaging system comprises (a) a first and second member movable between an open and closed position; (b) a scanning area disposed in either the first or second member and accessible when the system is in the open position for receiving and scanning the image to produce a digital image; (c) a display for displaying the digital image; (d) memory for storing the digital image; and (e) an output device for transferring the digital image stored in the memory to a removable media.

According to a still further aspect of the invention, there is provided a portable image capture device transportable by a user between a plurality locations for scanning an image for later production of an image product. The portable image capture device comprises (a) a first and second member movable between an open and closed position; (b) a scanning area disposed in either the first or second member and accessible when the system is in the open position for receiving and scanning the image to produce a digital image; (c) a modulated light source for illuminating the image; (d) memory disposed within the base member for storing the digital image; and (e) a communications means adapted to transmit the digital image stored in the memory to an image producing device for production of the image product comprising the digital image.

According to a yet another aspect of the invention, there is provided a portable imaging system transportable by a user between a first and second location for scanning an image for later production of an image product. The portable imaging system comprises (a) a scanning area for receiving and scanning the image to produce a digital image; (b) a display for displaying the digital image; (c) memory for storing the digital image; and (d) a communication port adapted to transmit the digital image from the portable imaging system over a communications network to a device for later production of the image product comprising the digital image.

The present invention provides a portable kiosk which is suitable for use by a user in a home environment which is able to convert photographs to digital form for later printing. The portable kiosk of the present invention is particularly configured for the sporadic user who may not be familiar with the computer systems.

BRIEF DESCRIPTION OF THE DRAWINGS

The foregoing and other objects, features, and advantages of the invention will be apparent from the following more particular description of the preferred embodiments of the invention, as illustrated in the accompanying drawings.

DETAILED DESCRIPTION OF THE INVENTION

Figure 1:
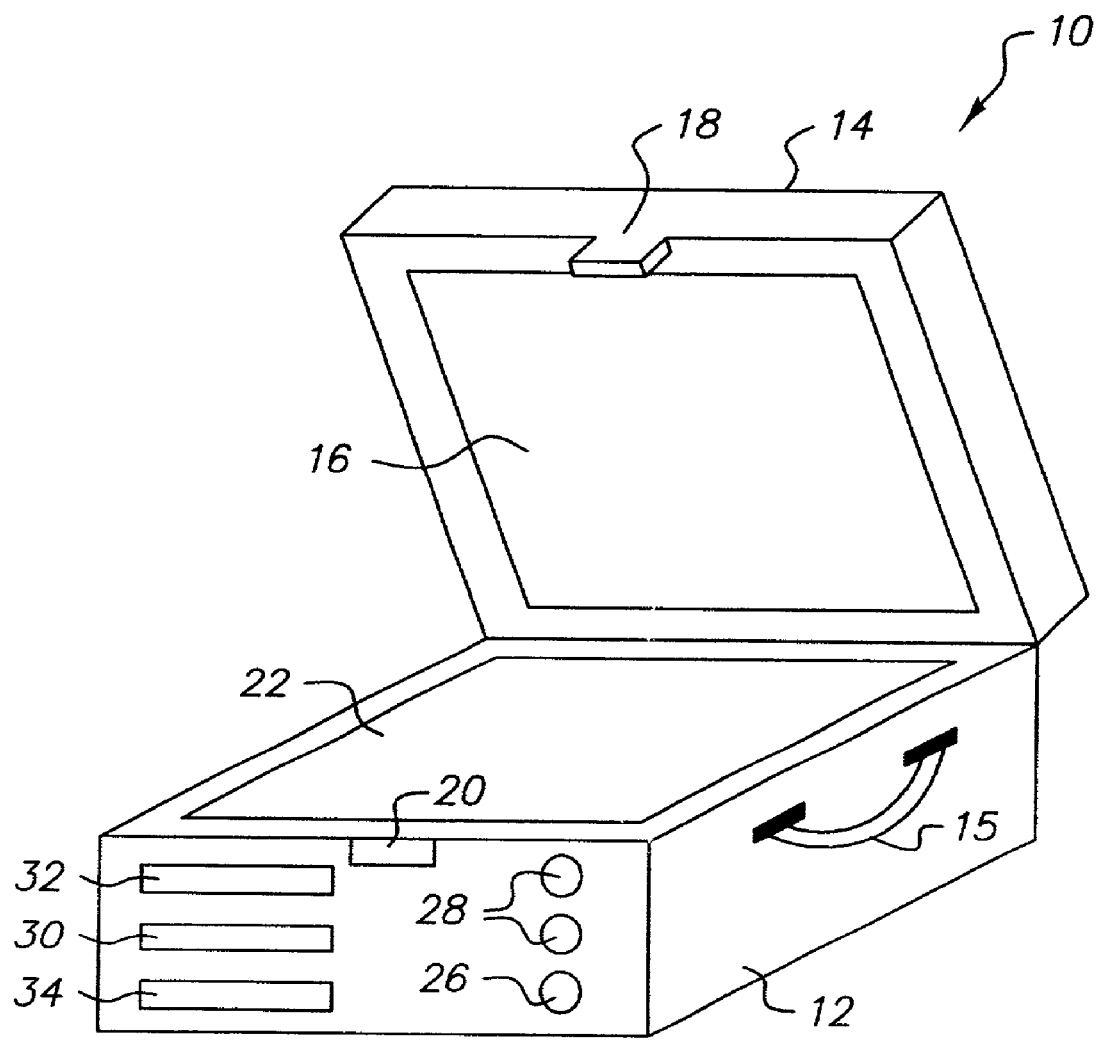
FIG. 1 shows a perspective view generally illustrating a first embodiment of a portable kiosk in accordance with the present invention.

The following is a detailed description of the preferred embodiments of the invention, reference being made to the drawings in which the same reference numerals identify the same elements of structure in each of the several figures.

The present invention is directed to a portable imaging system or kiosk which is capable of being carried, and is easily moved.

One embodiment of a portable imaging system in accordance with the present invention is generally illustrated in FIG. 1. Portable imaging system 10, hereinafter referred to as kiosk 10, is preferably of a small size so that it can be readily ported to various locations by a user. Accordingly, kiosk 10 is preferably provided in a form approximately the size and proportions of a laptop computer, a briefcase or a child's lunch box. Kiosk 10 includes a first member 12 and a second 14 movable between an open and closed position.

A handle 15 may assist in porting kiosk 10 between locations. As shown in FIG. 1, disposed on the inside of second member 14 is a display 16, such as a color LCD. Display 16 can be a touchscreen display, whereby a user can provide information and data to kiosk 10, such as an order request or user name. Alternatively, kiosk 10 may comprise a keyboard (not shown) as an input device to provide information and data to image producing device 10.

First and second member 14 are preferably biased to remain in the open position for viewing of display 16 by a user. When in the closed position, a latch 18 and securing member 20 secures first member 12 and second member 14 in the closed position for transport. When in the open position, a scanning area or platen 22 is revealed and accessible onto which an image (such as a photograph or film negative) can be placed and scanned into a resident memory means using a scanner or other scanning device (not shown) housed within first member 12, thereby capturing the image in electronic/digital form to produce a digital image. The memory means can be any known available means, such as a solid state memory card, floppy disc, compact disc, hard drive, discrete circuit board mounted memory IC's, etc., which provides temporary storage of digital data. It may be desired to provide redundant memory means to ensure that no data is lost. The scanner could include any of the available imaging array devices, for example: linear or area; CMOS or CCD. Alternatively, scanning area 22 may be configured as an opening, such as a slot, in either first or second member 12,14, to receive the image to be scanned. The memory means can be disposed in a unit removable from first or second member 12,14.

In operation, the user's image is placed on scanning area 22 and scanning is initiated by an operation member 26, such as a start button, whereby scanning of the image into memory occurs to produce a digital image. After scanning is complete, the image may be displayed on display 16. Once displayed, features of kiosk 10 may be initiated using one or more members 28 to modify the digital image, for example, zoom, rotate, crop. Software disposed in the memory may be employed for modifying the digital image. This modification of the digital image can be accomplished prior to transmitting the digital image for production of an image product.

Kiosk 10 also includes an output port or communication port 30 for communicating over a communication network between kiosk 10 and another device, such as a printer, computer, storage device, or processor, so as to be able to transmit the digital image from kiosk 10 to the other device. Once transmitted, the digital image can be printed, stored, used to produce the image product, or further transmitted. Since kiosk 10 is portable, a feature of the present invention is that kiosk 10 can be transported to the other device to which it is to communicate so that direct communication can occur.

If kiosk 10 does not include output port 30, then kiosk 10 includes an output device for transferring the digital image stored in the memory to a removable media. An example of such an output device is a CD writer for writing a CD.

For added versatility, kiosk 10 may be configured for modular substitution of the image input portion. In such an embodiment, the user may select the appropriate module contingent upon the image source. For example, in addition to the aforementioned scanning of images, images in digital form can be transferred from kiosk 10 to another device in digital form. Further, images and content already in digital form may be input by file transfer (for example, from a CD player, a memory card reader, a slide scanner, or a computer) through a provided interconnection such as a USB port. Accordingly, portable kiosk 10 may further include one or more input ports 32 to receive images which are in digital form. Input port 32 is illustrated in FIG. 1 as an opening in first member 12 for receiving digital images from removable media such as a memory card, compact disc (CD) or other digital storage means.

Kiosk 10 may also include a payment mechanism 34 for receiving payment. An example of a known payment mechanism is a credit card reader, and those skilled in the art will be aware of other known payment mechanisms.

It is understood that if kiosk 10 is electronic input enabled, other forms of content, such as video clips, theme templates, canned (i.e., pre-recorded) sounds, etc., can be incorporated into the presentation. Accordingly, input port 32 may also be configured to receive such other forms of content.

Figure 2:
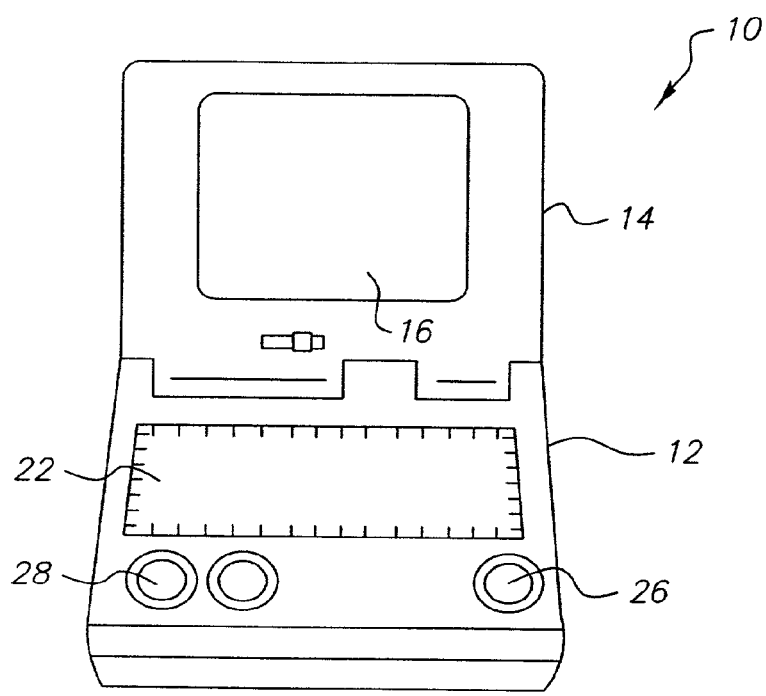
FIG. 2 shows a perspective view generally illustrating a second embodiment of a portable kiosk in accordance with the present invention.
Figure 3:
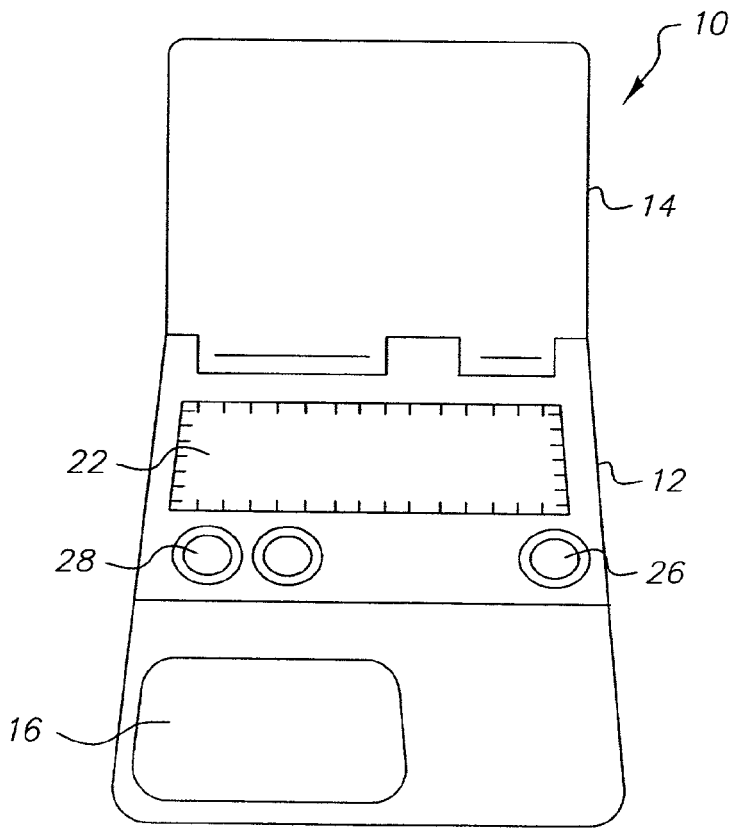
FIG. 3 shows a perspective view generally illustrating a third embodiment of a portable kiosk in accordance with the present invention.
Figure 4:
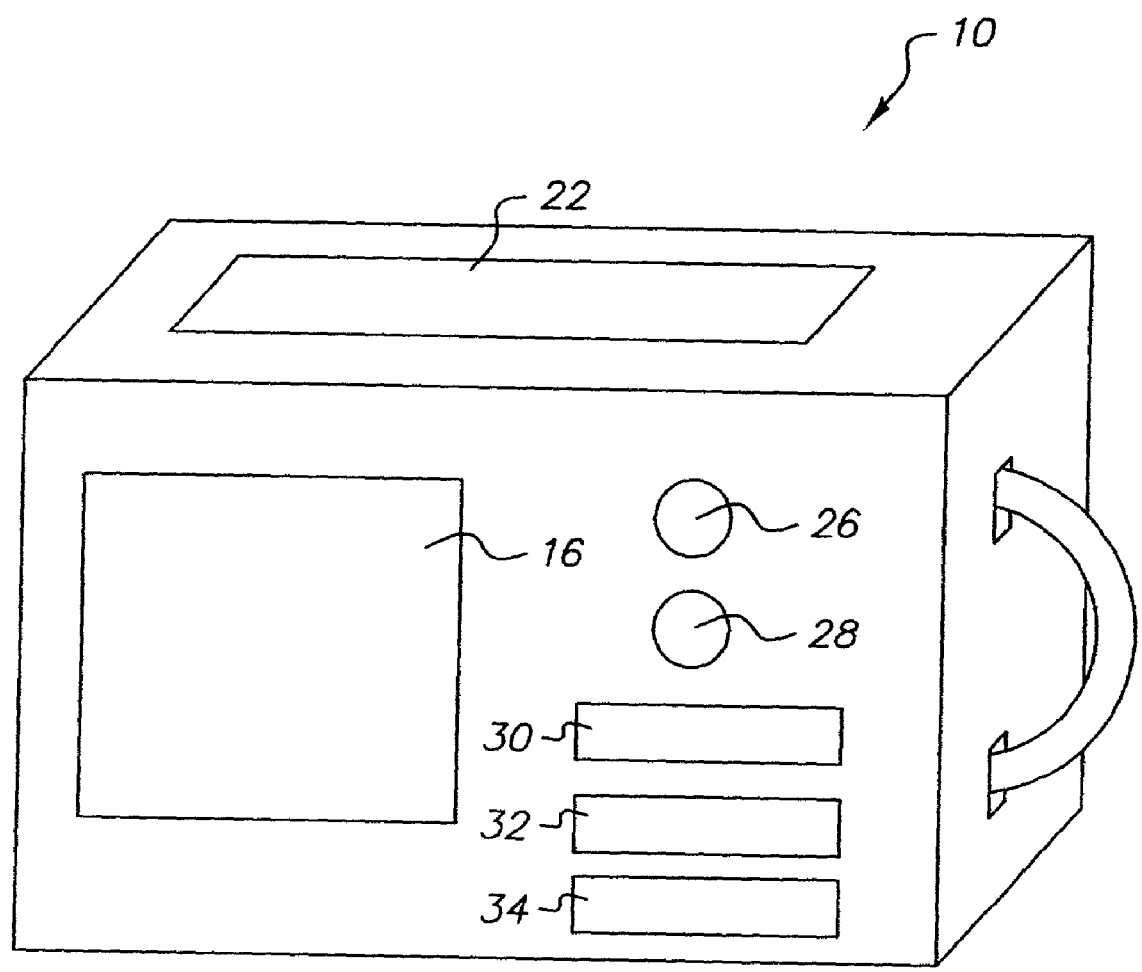
FIG. 4 shows a perspective view generally illustrating a fourth embodiment of a portable kiosk in accordance with the present invention.

A second embodiment of a portable kiosk is generally illustrated in FIG. 2 wherein operation member 26 is disposed proximate scanning area 22. A third embodiment of kiosk 10 is generally illustrated in FIG. 3, wherein display 16 is disposed in first member 12 rather than second member 14. A third embodiment of kiosk 10 is generally illustrated in FIG. 4, wherein kiosk 10 is comprised of a single member with scanning area 22 disposed within the single member. For example, FIG. 4 shows scanning area 22 as a slot for receiving an image. Other embodiments for kiosk 10 may be contemplated.

In operation, user's image is placed on scanning area 22 to digitize the image. Scanning of the image is initiated using operation member 26, whereby the image is scanned into the memory means to produce a digital image. After scanning is complete, the digital image may be displayed on display 16.

If the image to be scanned is a photographic film negative, then kiosk 10 preferably includes a modulated light source for illuminating the image. This light source functions as a display when kiosk 10 is in the open position, and functions as a light source when kiosk 10 is in the closed position. For scanning, it may be desirable to "pre-scan" the image at least once. During such a pre-scan, the display outputs unmodulated white light. After obtaining a pre-scan reduced resolution image, the image may require more or less illumination or require a color change to the illumination source to compensate for exposure, film type, scene illumination, and other variations that effect the film image. In the situation of subject illumination failure, drastic exposure variation occurs within a single film image. An example of this condition occurs when electronic flash is used to illuminate a human face at a close distance. The electronic flash typically overexposes the face and under-exposes the background area, which is usually farther away from the flash. This type of condition appears on negative film as a very dark face and a very light background. Since display 16 is employed as a light source, areas of display 16 can be modulated to reduce or increase intensity and/or color to compensate for over and under exposure conditions. This is accomplished by adapting the image reproduction capabilities of display 16 to spatially match the shapes and patterns of the transparency film image. Once scale and location of the illumination image and the film image are matched/overlaid and the illumination display image can be modulated to compensate exposure variations in the film image.

If desired, prior to scanning, the image may be analyzed, for example, for content of professional logos, or other copyright marks such as described in U.S. Pat. No. 6,001,516 (Gasper), commonly assigned and incorporated herein by reference. Other input means may be included to provide added functionality and utility, one of which may be used to start and end an audio recording through an integral or attached microphone. Anticipated uses of this feature include a narration of the captured event, identification of the individuals and objects in the image, musical scoring, and staged re-creation of what was originally heard when the picture was taken.

Disposed in the memory may be advertisement or instructional information. Such information would be displayable on display 16 when the system is in the open position. For example, instructional information may include how to operate kiosk 10. Or if kiosk 10 is being used to capture digital images for scrapbooking, advertisements for new scrapbooking products may be displayed. Still further, the memory may comprise software for tracking information associated with the scanned digital image, for example the date the image was scanned, or a name to reference the image.

Figure 5:
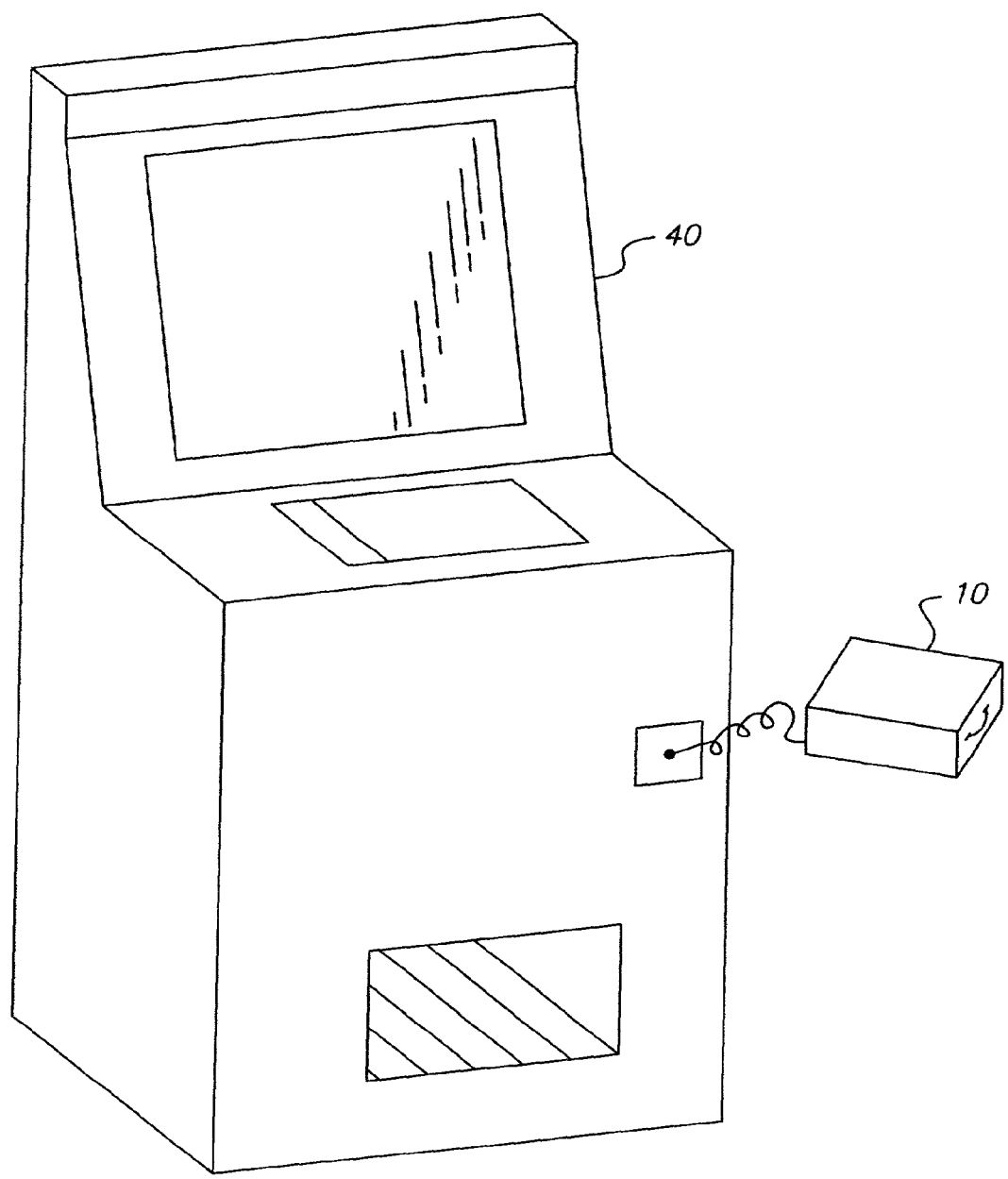
FIG. 5 shows the portable kiosk in accordance with the present invention in communication with a non-portable imaging device.

As configured in FIG. 1, kiosk 10 is a modular, self-contained unit. Because of its size, kiosk 10 is suitable for transporting from location to location. Because of its portability, a user can collect/capture images at various locations, and then transport the images to a location wherein the image product can be produced. Accordingly, in a preferred embodiment, kiosk 10 is configured to communicate with or attach to a non-portable image producing device, such as the Kodak Picture Maker from Eastman Kodak Company located at retail locations, or a retail or wholesale photofinishing lab. FIG. 5 generally illustrates kiosk 10 in communication with a non-portable imaging device 40. It is understood that other communication means may be physically or electrically connected. For example, if hardwired, a USB connection can be employed. Other means include RF, infrared or other wireless communication means.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 10 kiosk
12 first member
14 second member
15 handle
16 display
18 latch
20 securing member
22 scanning area; platen
26 operation member
28 member
30 output port
32 input port
34 payment mechanism
40 non-portable imaging device

What is claimed is:

1. A portable imaging system transportable by a user for scanning an image for later production of an image product, comprising:
 (a) a first and second member movable between an open and closed position;
 (b) a scanning area disposed in either the first or second member and accessible when the system is in the open position for receiving and scanning the image to produce a digital image;
 (c) a memory for storing the digital image;
 (d) a communication port adapted to transmit the digital image from the portable imaging system over a communications network to a device for later production of the image product from the digital image; and
 display disposed in either the first or second member for displaying the digital image and for displaying an advertisement information when the system is in the open position.

2. The portable imaging system of claim 1, further comprising a second, redundant, memory to provide backup storage of the digital image to ensure the digital image is not lost.

3. A portable image capture device transportable by a user for scanning an original image for later production of an image product, comprising:
 a first and second member movable between an open and closed position;
 a scanning area disposed in either the first or second member and accessible when the system is in the open position for receiving and scanning the image to produce a digital image;
 a modulated light source for illuminating the original image, said modulated light source functioning as a display when the portable image capture device is in the open position and also functioning as a light source for the scanning area when the portable image capture device is in the closed position;
 a memory for storing the digital image; and
 a communications means adapted to transmit the digital image stored in the memory to an image producing device for production of the image product from the digital image.

4. The portable imaging system of claim 3 further comprising a second, redundant, memory to provide backup storage of the digital image to ensure the digital image is not lost.

5. A portable imaging system transportable by a user for scanning an image for kiter production of an image product, comprising:
 (a) a first and second member movable between an open and closed position;
 (b) a scanning area disposed in either the first or second member and accessible when the system is in the open position for receiving and scanning the image to produce a digital image;
 (c) a memory for storing the digital image;
 (d) a communication port adapted to transmit the digital image from the portable imaging system over a communications network to a device for later production of the image product from the digital image; and
 a video input device for receiving one or more video clip relating to the digital image.

* * * * *